Dec. 12, 1967

F. ULRICH 3,358,272

STORING-AND COUNTING-CIRCUIT WITH MAGNETIC ELEMENTS OF RECTANGULAR HYSTERESIS LOOP

Filed Aug. 5, 1963

4 Sheets-Sheet 1

INVENTOR
FRIEDRICH ULRICH

BY Percy P. Lantzy
ATTORNEY

INVENTOR
FRIEDRICH ULRICH

BY Percy P. Lantzy
ATTORNEY

Dec. 12, 1967 F. ULRICH 3,358,272

STORING-AND COUNTING-CIRCUIT WITH MAGNETIC ELEMENTS OF RECTANGULAR HYSTERESIS LOOP

Filed Aug. 5, 1963 4 Sheets-Sheet 3

INVENTOR
FRIEDRICH ULRICH

BY [signature]
ATTORNEY

Dec. 12, 1967

F. ULRICH 3,358,272

STORING-AND COUNTING-CIRCUIT WITH MAGNETIC ELEMENTS OF RECTANGULAR HYSTERESIS LOOP

Filed Aug. 5, 1963

4 Sheets-Sheet 4

INVENTOR
FRIEDRICH ULRICH
BY Percy P. Lantzy
ATTORNEY

United States Patent Office 3,358,272

Patented Dec. 12, 1967

3,358,272

STORING- AND COUNTING-CIRCUIT WITH MAGNETIC ELEMENTS OF RECTANGULAR HYSTERESIS LOOP

Friedrich Ulrich, Stuttgart-Bad Cannstatt, Germany, assignor to International Standard Electric Corporation, New York, N.Y., a corporation of Delaware Filed Aug. 5, 1963, Ser. No. 299,930
Claims priority, application Germany, Aug. 28, 1962, St 19,643
2 Claims. (Cl. 340—174)

ABSTRACT OF THE DISCLOSURE

Magnetic-core-storing- and counting-circuit in the binary code. The arrangement uses as multistable storing element a cascade of magnetic elements which can be reversed at different field intensities. At each storing- or counting-impulse the current flow is initiated through this cascade. If an element is reversed the current flow is interrupted and switched-on again in the opposite direction and in such a magnitude that all elements which were previously reversed at lower field intensities are set back into their original condition.

The invention relates to a storing- and counting-device with magnetic elements of rectangular hysteresis loop, whereby the individual stable positions are represented in the binary code.

It is known to use magnetic elements in storing- or counting-circuits. The simplest form for an arrangement to store or count $n$ values an $n$-stage cascade-circuit is selected which is advanced in the 1-out-of-$n$-code. Such storing- and counting-circuits are very expensive, particularly in case of higher values of $n$. It is also possible to design circuits with a smaller number of stages by selecting the mode of counting in the binary code. In storing- and counting-circuits which use magnetic elements several cores, however, must be used per bit, moreover there still remains a considerable expenditure in coupling means in order to perform storing or counting in the binary code. The increasing number of necessary binary positions or digits also increase the expenditure in coupling means. Therefore an enlargement of the storing- or counting-rate always results in a considerably increased expenditure of coupling elements.

The object of the invention is to provide a storing- and counting-circuit with magnetic elements of rectangular hysteresis loop which remains small in expenditure even at high values of $n$ and which nevertheless can operate in the binary code in order to keep the number of storing elements to a minimum. The basis of the invention is the known series-connection of several magnetic elements, which are controlled by different field intensity values, and which form a storing- and counting-circuit in the binary code, using such a multi-stable storing element, in that a current flux is initiated at each storing- or counting-impulse via said cascade circuit. When reversing a magnetic element the control current is switched-off via the induced reading impulse and a resetting current led to all magnetic elements, said resetting current being a little less than the preceding reversing current, so that all magnetic elements, which were reversed already at smaller field intensities, are reset into their normal position. By this method the magnetic elements are reversed corresponding to the binary code. Always then, when a magnetic element of minor value is reversed all elements of a lower value are reset to zero and only reversed again by the following storing- or counting-pulses. In a suitable embodiment of the storing- and counting-circuit according to the invention magnetic cores with different coercive force, will be used as magnetic elements, or equal magnetic cores with a differently dimensioned control winding or with a differently long magnetic path, or also transfluxors can be used. The latter ones offer the possibility as known to read the switching condition of the storing- and counting-circuit without destruction.

The invention provides a trigger circuit for switching-in and -off the reversing current of the cascade, which trigger circuit is reset into one position by the storing- or counting-pulses and by the pulses induced in the reading loop again into their original position. The pulses induced via the reading loop are led via an indicator to the control input of the bistable trigger circuit, initiating resetting. The resetting current for the magnetic elements is produced through an induction coil which is series-connected with the cascade-circuit. The discharging current of the induction corresponding to the just switched-off setting current of the magnetic elements is led only partly via the resetting loop of the magnetic elements. This current reduction has been selected, so that only the elements, which were reversed by smaller field intensities, are reset into their original position. A further embodiment of the storing- and counting-circuit is characterised in this that for backward counting the loops of the magnetic elements are polarity reversed. The counting device can be controlled through a switching means effecting this pole reversal. According to a further embodiment of the invention the cascade-circuit of the magnetic elements can be led, after storing or counting, via the controlling trigger circuit into the original or into the final position. Thereby the bistable trigger circuit is swtched over into a monostable trigger circuit. The condition the circuit has after reading out depends on the polarity of the loops selected by the magnetic elements. The circuit arrangement can also be used, according to the invention, as a parallel-series converter, if the magnetic elements can be set to any arbitrary switching condition through separate windings, and this switching condition can be read in conjunction with the monostable trigger circuit in one or the other way. The output signal is a pulse sequence in which the number of pulses corresponds to the stored binary value or to the complement value of the stored final value.

The invention will in detail be explained with the aid of the accompanying drawings in which.

Figure 1:
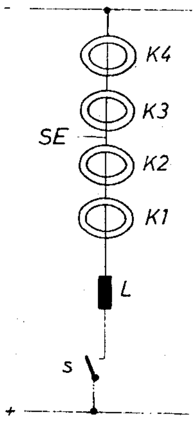
FIG. 1 shows the cascade-circuit of magnetic elements and the induction coil.

FIG. 1 shows the basic circuit of the multi-stable storing element. If the contact $s$ is closed, the current slowly rises via the setting loop SE through the magnetic cores K1 . . . K4 due to the induction coil L. The magnetic cores K1 . . . K4 are selected in such a way that they need, commencing at core K1, always an increasing field intensity for their reversal. This can be obtained either by selecting different magnetic material, or by different lengths of the magnetic paths or also by differently dimensioned setting windings SE. Instead of normal magnetic cores also perforated plates of ferrite, angular tape cores, transfluxors etc. may be used. When using transfluxor-type magnetic elements it is to the advantage that the switching condition of the cascade circuit can be read in a proper static condition.

If in the original position all magnetic elements are in the remanence point "0," then the other remanence point "1" is set due to the current flux. Since the current raises more flatly with the time elapsing, the cores are successively reversed. This basic circuit is used to construct the storing- and counting-circuit according to the invention.

Figure 2:
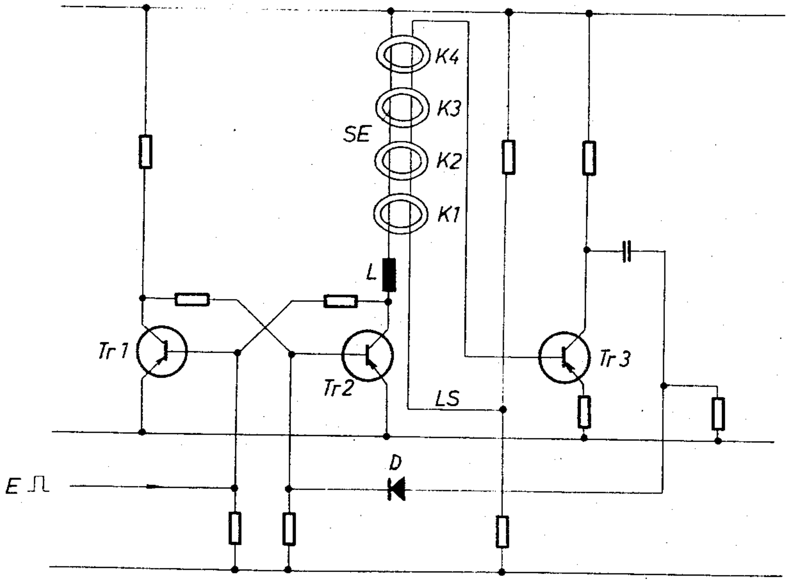
FIG. 2 shows a control circuit for a successively setting of the cascade circuit.

FIG. 2 shows a simple counter in which the cores K1 . . . K4 are successively reversed. The storing- or counting-pulses reach the input E of a bistable trigger circuit from the transistors *Tr*1 and *Tr*2. In the original condition the transistor *Tr*1 is conductive. Due to positive control pulses the trigger circuit is triggered over into the other stable condition. Since in said condition the transistor *Tr*2 is conductive a current starts to flow through the cascade circuit of induction L and the magnetic elements K1 . . . K4. If the current has raised to such an extent that the core K1, which reverts at the lowest field intensity, triggers, this core is in the condition "1." At this triggering process an impulse is induced in the reading loop LS which is fed back to the control circuit of transistor *Tr*2 of the bistable trigger-circuit, amplified through the indicator transistor *Tr*3. The bistable trigger circuit returns to its original condition and transistor *Tr*1 is conductive again. The current in the cascade connection is switched off so that the cores K2 to K4, which revert only at higher field intensities, remain in their original condition "0." At the following storing- or counting-impulse the trigger circuit is again reversed. The current in the cascade connection flows again. Since the core K1 is already reversed the current raises until that field intensity is reached which suffices to reverse the core K2. An impulse is again produced in the reading loop LS at the triggering, which is used to return the trigger circuit into its original position. In order to obtain a decoupling from the control pulses, it is recommended to let these control impulses influence the input E of the trigger-circuit via a differentiating means. At each storing- or counting-impulse another core is set into condition "1" in the way described above. For a storing- or counting-rate *n*, *n*-cores must be provided in the cascade connection. This, however, leads to too high an expenditure as already described in the preamble. The storing- and counting-circuit must be modified in such a way that operation of the cores is advanced in the binary code. This is shown in the circuit in FIG. 3.

The cores K1 . . . K4 are set as for the circuit arrangement according to FIG. 2, through a bistable trigger circuit, consisting of transistors *Tr*1 and *Tr*2. In the original position all magnetic cores K1 . . . K4 are in the condition "0." At the first storing- or counting-impulse the core K1 is reversed and the trigger circuit reset to its original condition through the indicator transistor *Tr*3. When the current in the cascade connection is switched-off the current-circuit becomes effective via the diode D and a resetting loop LS, which takes up a part of the discharging current of the induction. The ratio of this part to the discharging current can be set by the resistor R1 and the parallel resistor R2. The maximum current during the discharge of the induction should not be sufficient to reset again the just reversed core. At the following storing- or counting impulse the core K2 is reversed as already explained with the aid of FIG. 2. At the following discharge of the induction, not the core K2, but the core K1 is reset to normal. If the cores K1 to K4 have the valences $2^0$, $2^1$, $2^2$, $2^3$, a storing- and counting-circuit in the binary code is obtained. At the moment a core, e.g. K3, is reversed the cores of a lower valance, e.g. K2, K1, are reset to normal at the discharge of the induction coil. If, for example, only the core K3 is reversed this corresponds to the binary position "4." At the succeeding impulse the core K1 is reversed without any resettting when the induction is discharged. The binary position "5" is determined by the condition "1" of the cores K1 and K3. At the following impulse the core K2 is reverted and the core K1 reset to its original position. The output code can be represented by the following table:

| Position | K4 | K3 | K2 | K1 |
|---|---|---|---|---|
| 0 | 0 | 0 | 0 | 0 |
| 1 | 0 | 0 | 0 | 1 |
| 2 | 0 | 0 | 1→ | 0 |
| 3 | 0 | 0 | 1 | 1 |
| 4 | 0 | 1→ | 0→ | 0 |
| 5 | 0 | 1 | 0 | 1 |
| 6 | 0 | 1 | 1→ | 0 |
| 7 | 0 | 1 | 1 | 1 |
| 8 | 1→ | 0→ | 0→ | 0 |
| 9 | 1 | 0 | 0 | 1 |
| 10 | 1 | 0 | 1→ | 0 |
| 11 | 1 | 0 | 1 | 1 |
| 12 | 1 | 1→ | 0→ | 0 |
| 13 | 1 | 1 | 0 | 1 |
| 14 | 1 | 1 | 1→ | 0 |
| 15 | 1 | 1 | 1 | 1 |

The arrows in the table above mean the effect of the discharging current of the induction L on the cores of lower valence.

A relay may also be used as induction L. By the inertia of the switching means the final condition of the storing- and counting-circuit can be detected in a most simple manner. As long as the current flows through the cascade and, consequently, through the relay only for a short time said relay does not respond. Only when the final condition is reached, viz. all cores in condition "1" and another impulse arrives the current flow through the cascade connection remains switched-on and the relay operates.

Figure 3:
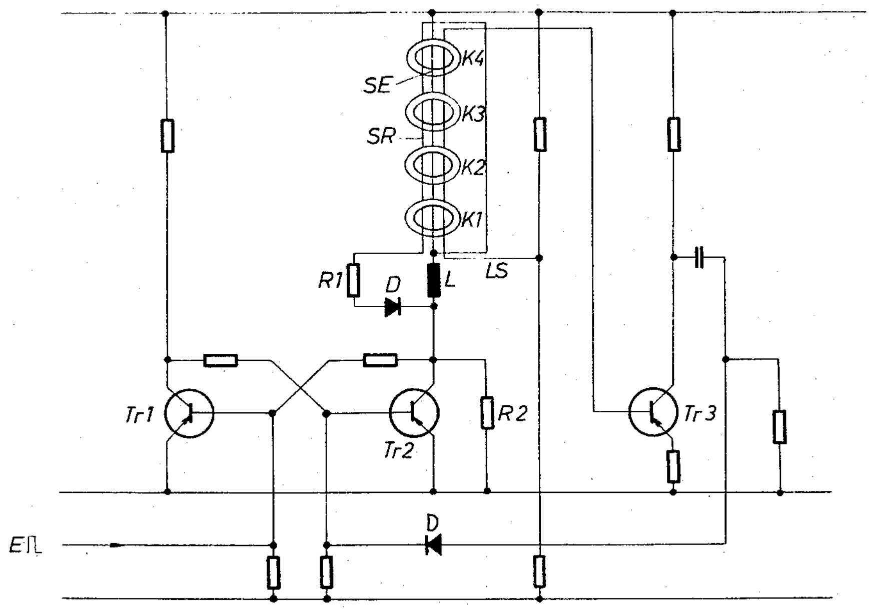
FIG. 3 shows the storing- and counting-circuit according to the invention.
Figure 4:
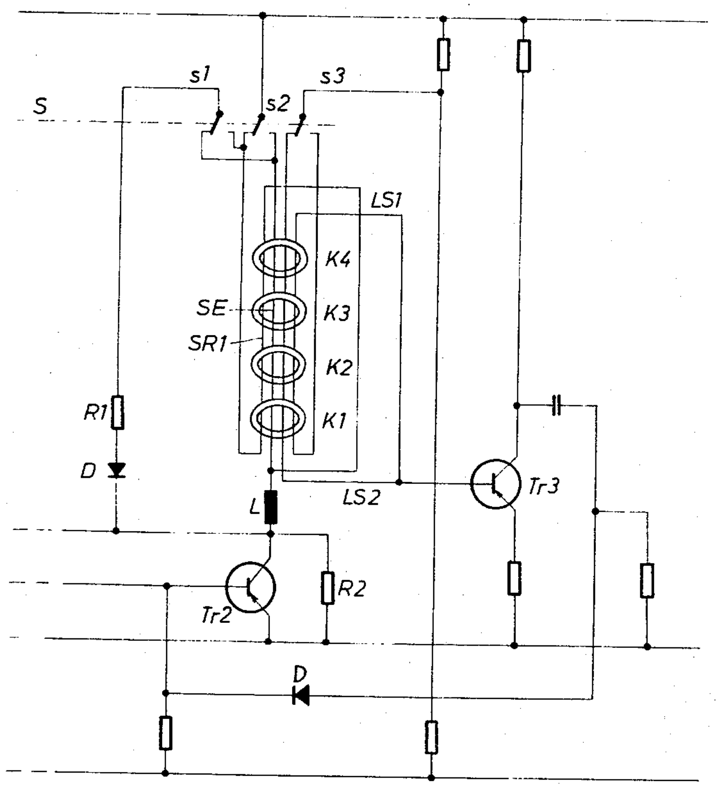
FIG. 4 shows a modification of the circuit arrangement for forward- and backward-counting.

FIG. 4 shows a modification of the circuit arrangement according to FIG. 3 which permits that the storing- and counting-arrangement operates in the forward- or backward-direction. The only modification is that all loops of the magnetic elements are polarity-reversed through a separate switching means, not shown on the drawing. When the switches *s*1 . . . *s*3 are in the position shown on the figure backward counting is achieved. The setting current flows through the reset winding SR and only the cores in the condition "1" can be reset into the condition "0." Assuming that the cascade connection is in the binary position "4" the current raises till the core K3 is reversed. Thereupon the cores K1 and K2 are set into position "1" through the discharge current circuit of the induction L, which corresponds to the binary position "3." The discharging circuit in that case operates the setting loop SE. Forward- or backward-counting is possible, only depending on the position of switches *s*1 . . . *s*3. The functions of the setting- and resetting-loop are thereby interchanged. Since the indicator transistor *Tr*3 responds only to pulses of a certain polarity two reading loops LS1 and LS2 are provided which are switched-on or -off through contact *s*3. Therefore only one reading loop is connected to the indicator in such a way that this indicator receives pulses of same polarity, independent of the direction of counting.

Figure 5:
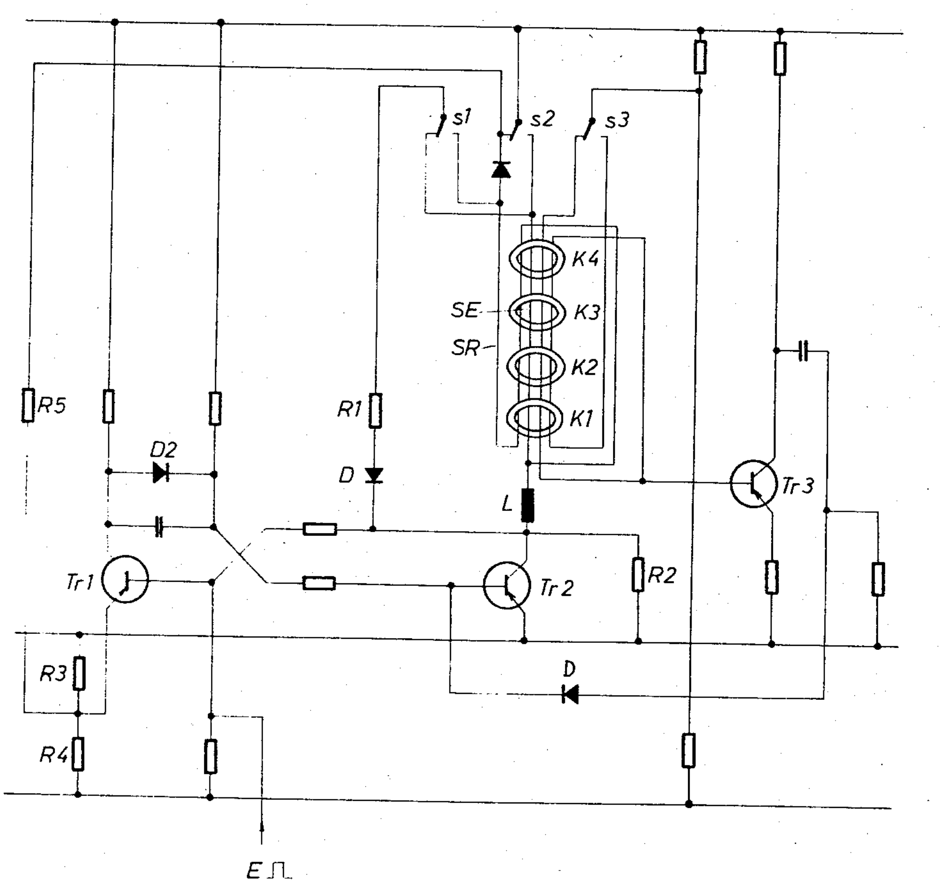
FIG. 5 shows an enlargement of the control circuit, so that the storing circuit automatically renders the stored binary value in a series code.

FIG. 5 shows an arrangement how to read the storage condition automatically. After storing of a certain number of pulses or by direct reversal of the corresponding magnetic cores a certain, predetermined binary position is assumed the storing- and counting-condition can automatically be read by switching over of the bistable trigger circuit from the transistor *Tr*1 and *Tr*2 into a monostable trigger circuit. In the bistable trigger circuit the collector of the conductive transistor *Tr*1 is slightly positive due to the voltage divider, consisting of the resistors R3 and R4. The diode D2 also keeps the base of transistor *Tr*2 to this potential so that the transistor remains cut-off. As soon as reading out is initiated (contact position *s*1 . . . *s*3 as shown in FIG. 5) the emitter potential of the transistor *Tr*1 becomes slightly negative through contact *s*2 and the resistor R5 so that the diode D2 cannot prevent any more that the transistor *Tr*2 becomes conductive. The circuit is now monostable. Due to the current flow via transistor Tr2 a backward counting pulse is produced. The feed-back impulse of the reading loop interrupts the current flow via transistor Tr2. Since this condition, however, is unstable the transistor Tr2 becomes conductive again after elapsing of a certain delay time and a new counting step is initiated. This process is repeated until all cores are again in the condition "0." The number of pulses to be scanned thereby via the trigger circuit corresponds to the binary value from which the reading is initiated. The setting- and resetting-loop of the magnetic cores may also remain unchanged during the reading-out. When reading-out all cores are led into the condition "1" and a number of pulses can be tapped at the trigger-circuit which corresponds, with reference to the output value, to the complement value of the final value in the storing arrangement.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A storing- and counting-circuit with magnetic elements of rectangular hysteresis loop, comprising a multistable storing element having a cascade of magnetic elements reversible at various field intensities, a storing impulse source, trigger means responsive to the impulse source for generating a current flow through the cascade, a magnetic element for each counting or storing impulse, the trigger means so arranged that when reversing of any one of the elements the current flow over the cascade is switched-off and switched-on again in the opposite direction and in such a magnitude that all elements previously reversed at lower field intensities are returned into their original conditions, the trigger means being connected between the cascade and the storing impulse source to switch on and off the reversing current of the cascade, which trigger means is set through the storing- or counting-pulses in one condition and through the impulses occurring in the reading loop coupled between said magnetic elements and said trigger means is reset again.

2. Apparatus according to claim 1 wherein an indicator means including a transistor is connected between the reading loop and the trigger means whereby a signal generated in the leading loop initiates the resetting.

References Cited

UNITED STATES PATENTS

| | | | |
|---|---|---|---|
| 2,805,408 | 9/1957 | Hamilton | 340—174 |
| 3,103,593 | 9/1963 | Woodland | 307—88 |
| 3,111,661 | 11/1963 | Gatzert et al. | 340—347 |
| 3,145,370 | 8/1964 | Gianola | 340—174 |
| 3,210,743 | 10/1965 | Kaenel | 340—174 |

BERNARD KONICK, *Primary Examiner.*

S. M. URYNOWICZ, *Assistant Examiner.*